United States Patent [19]
Pelletier et al.

[11] 4,226,113
[45] Oct. 7, 1980

[54] LEAK DETECTING ARRANGEMENT ESPECIALLY SUITABLE FOR A STEAM CONDENSER AND METHOD

[75] Inventors: Charles A. Pelletier, Bethesda; Edgar D. Barefoot, Gaithersburg, both of Md.

[73] Assignee: Electric Power Research Institute, Inc., Palo Alto, Calif.

[21] Appl. No.: 29,707

[22] Filed: Apr. 11, 1979

[51] Int. Cl.³ ............................................. G01M 3/22
[52] U.S. Cl. ..................................................... 73/40.7
[58] Field of Search .................... 73/40.7, 40.5 R, 49.1

[56] References Cited
U.S. PATENT DOCUMENTS

| 3,425,264 | 2/1969 | Frei | 73/40.7 X |
| 3,474,662 | 10/1969 | Wilmsen et al. | 73/40.7 |
| 3,975,943 | 8/1976 | Brachet | 73/40.7 X |

FOREIGN PATENT DOCUMENTS 2102548 3/1972 France ........................................ 73/40.7

Primary Examiner—Gerald Goldberg
Assistant Examiner—Joseph W. Roskos
Attorney, Agent, or Firm—Flehr, Hohbach, Test

[57] ABSTRACT

The detection of leaks in tubes, particularly cooling tubes in a steam condenser, is disclosed herein. In accomplishing this, a discrete amount of helium or similar tracer gas is initially directed into the front ends of the tubes while, at the same time, this gas is prevented from escaping into the ambient surroundings. Thereafter, the gas is drawn or otherwise moved by positive force through the tubes to the backends thereof, causing a portion of the gas to escape through leaks in the tubes, if any such leaks exist. The escaping gas, if any, is detected to indicate the presence of a leak and, at the same time, the non-escaping tracer gas reaching the backends of the tubes is captured and directed to a remote location.

13 Claims, 2 Drawing Figures

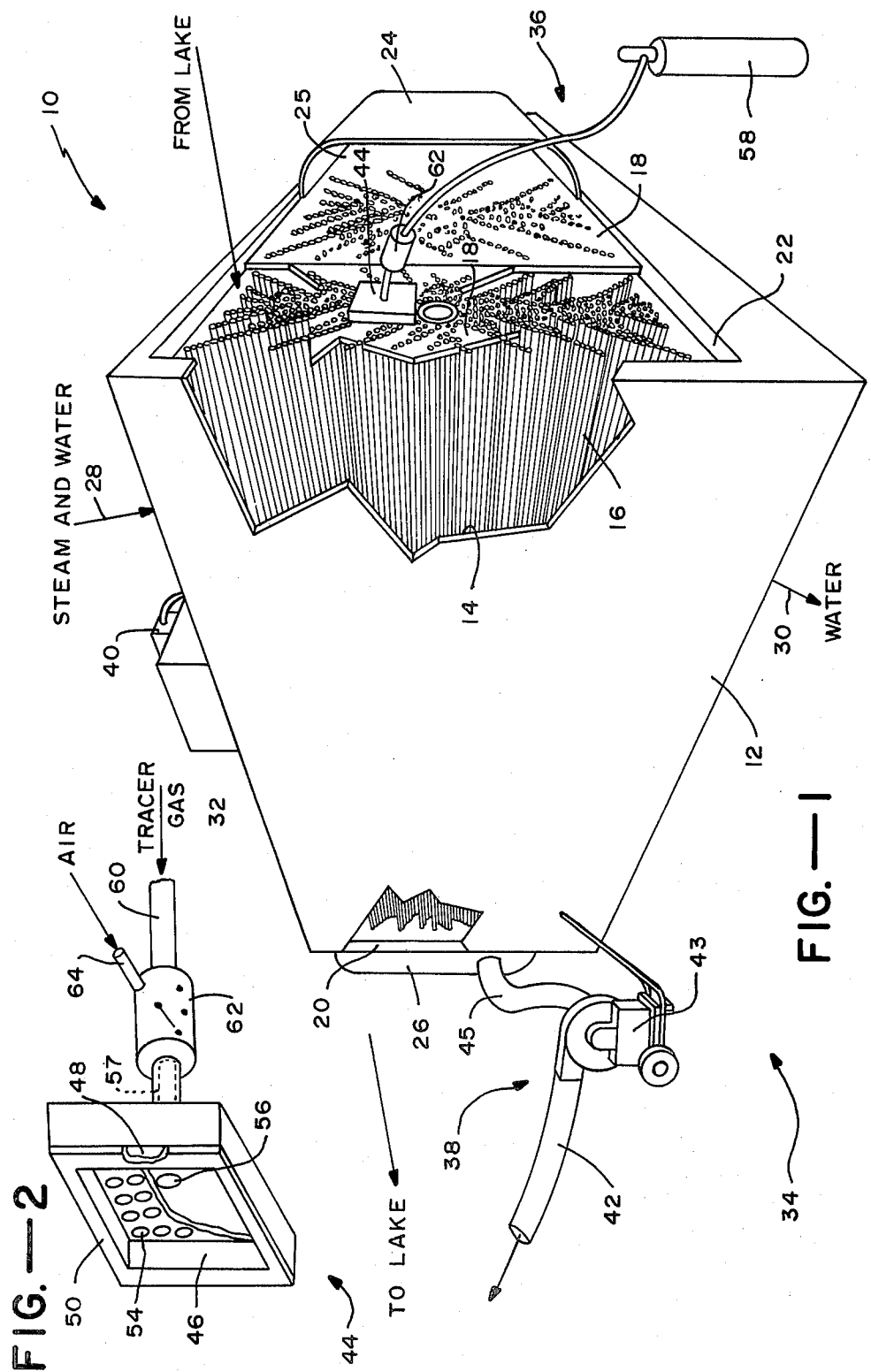

LEAK DETECTING ARRANGEMENT ESPECIALLY SUITABLE FOR A STEAM CONDENSER AND METHOD

The present invention relates generally to the detection of leaks in tubes and more particularly to an overall method of and arrangement for detecting leaks in cooling tubes comprising part of a steam condenser.

As background to the present invention, it is important to note that many power plant systems utilize steam to drive turbine engines. An overall system of this type will include the turbine engine itself, a steam generator, and a condenser interconnected together in a single process loop also including suitable circulation pump means. Steam produced at the generator is circulated to the turbine engine where it drives the latter and, in doing so, is reduced to a combination of the steam and water. This combination is circulated through the condenser for condensing the steam component to water and the output water is circulated back into the steam generator where it is again reduced to steam for driving the turbine engine.

A typical condenser of the general type used in the system just described is one which includes a large number of cooling tubes extending between and supported by a pair of spaced tube supporting end sheets or plates, all of which are located within an inner condensation chamber to receive the combination of steam and water from the turbine engine.

The cooling tubes are connected in fluid communication with a supply of coolant, typically water from the local lake or river. Obviously, if the condenser functions properly, this lake or river water which is contaminated is isolated from the circulated drive water and steam in the process loop. However, it should be equally obvious that any leaks in the tubes may cause some of this contaminated cooling water to be drawn therethrough and into the condensation chamber by the vacuum produced in the chamber as a result of the condensation process. While this contaminated water escaping into the chamber will most certainly mix with the drive water in the process loop, it has never been thought of as too serious of a problem heretofore. However, current research by the assignee of the present invention has indicated that there should be a concern in that the contaminated water may cause serious corrosion in the steam generators.

There are a number of presently available ways to detect for leaks in the tubes of a condenser. One of the most common technique consists of applying to the two end sheets on corresponding areas supporting opposite ends of a particular group of tubes, a material such as plastic film, detergent foam, wet paper, or light paste, which can seal tightly on the tube sheets around the ends of the tubes in the group being evaluated. In this way, should any of the tubes have a leak, the covering material should be drawn into those tubes as a result of the surrounding vacuum within the condensation chamber. Another vacuum related technique relies on pressure gauges, air bubbles, flame indicators or ultrasonic detectors. These latter devices, specifically the ultrasonic detectors, are particularly effective in locating large leaks which are at or close to the tube sheets themselves. This method consists of scanning the suspected tube sheet area with an ultrasonic scanning atmospheric probe which has a peak sensitivity between 35 and 45 khz. The probe detects the ultrasonic waves generated by the leaking gas turbulence. Still another technique relies on hydraulics and requires a complete shut down of the condenser system. In accordance with this latter technique, the steam side of the condenser is filled with water which may or may not be colored for tracing purposes. This water fills the condensation chamber around the tubes and is pressurized in the hope that it will find any leaks in the tubes and pass therein where it can be readily detected. Yet another technique calls for merely filling a plenum which surrounds corresponding ends of the cooling tubes with tracer gas with the idea that some will be drawn through an existing leak and into the condensation chamber. A detector is suitably positioned to detect the leaking gas.

All of the techniques described have certain drawbacks. For example, the first technique mentioned, that is, the one which utilizes plastic film, detergent foam, wet paper or light paste, is not particularly suitable in a typical environment of a power plant using a condenser of the type described. Moreover, the tube plates are often so massive that it is quite difficult and time consuming to apply the material to the entire surface of these plates. Also, in many cases the lighting in the surroundings is so poor that it is difficult, if not impossible, to see if any of the plastic film or other such material is drawn into any of the tubes. The second technique discussed, that is, the one which relies on pressure gauges, air bubbles, or the like, is not completely reliable, and in any case, it is quite time consuming. Utilizing hydraulics is also time consuming and, as stated above, requires a complete shutdown of the steam condensing system. The last technique, that is, the one using a tracer gas, is slow and inaccurate. For example, without the use of positive means to draw or force the tracer gas through the tubes (as in the present invention as will be seen), it may take a long time for the gas to reach and be drawn out of an existing leak.

In addition to the aforedescribed techniques fr detecting leaks in the cooling tubes, there is a known technique using tracer gas for detecting leaks into the condenser's condensation chamber through its housing. In accordance with the latter technique, the ambient surrounding around the condenser housing is filled with tracer gas so as to cause some to be drawn into the condensation chamber through any existing leaks in the immediate housing. This leaked in gas is then detected as in the case of the leaking cooling tube discussed above.

As will be seen hereinafter, the present invention provides for the detection of leaks in the cooling tubes of a steam condenser or, for that matter, in tubes generally without the recited drawbacks, but rather in a way which fulfills the following objects.

One object of the present invention is to provide a method of and arrangement for detecting leaks in one or more tubes in an uncomplicated, reliable and economical way and in a way which can be carried out relatively rapidly.

Another object of the present invention is to provide a leak detecting method and arrangement especially suitable in an environment of the type described previously.

A further object of the present invention is to utilize tracer gas in the detection of tube leaks in a rapid and reliable way.

Still a further object of the present invention is to prevent most if not all of the tracer gas just recited from entering the immediate surroundings of the tubes being inspected, other than the tracer gas escaping through the tube leaks, if any, whereby to reduce background noise during detection of the escaping gas.

As will be seen hereinafter, tube leaks are detected in accordance with the present invention by first directing a discrete amount of tracer gas, for example, helium, into the tube or tubes being inspected, at one end thereof and preferably in a way which, at the same time, prevents the tracer gas from escaping into the ambient surroundings. Thereafter, this tracer gas is caused to flow to the opposite end of the tube, preferably by means of an exhaust pump. In this way, if the tube does have a leak, a portion of the tracer gas will escape from the tube and it is this escaping gas which is detected to indicate the presence of a leak. At the same time, the nonescaping tracer gas reaching the opposite end of the tube is prevented from passing into the immediate surroundings of the tube (or tubes) and mixing with the gas being detected, preferably by first capturing all of the tracer gas reaching the opposite end of the tube and directing this captured gas to a remote location isolated from the immediate surroundings, either physically or by distance.

The technique just described is especially suitable for detecting leaks in the rather large number of cooling tubes in a relatively large steam condenser. In this case, as will be seen hereinafter, the recited technique is applied to a relatively large number of the tubes at the same time. In this way, if none of the tubes inspected have leaks, an entirely separate group of tubes can be inspected next, and so on. On the other hand, if it is determined that a leak exists in any given group of tubes, that group can be successively reduced in size until the particular tube or tubes having leaks are isolated. This can be carried out in the rapid and reliable manner.

The technique just described should be contrasted with the previously described technique where tracer gas is merely provided in the plenum surrounding the common ends of the cooling tube. In this latter technique, the gas is not caused to flow (drawn or forced) through the tubes and it is not captured at the other ends of the tubes or otherwise prevented from passing into the immediate surroundings of the tubes, for example, through leaks in the condenser's housing.

FIG. 1 is a perspective view of a steam condenser of the general type to which the present invention is directed and particularly illustrating an arrangement for detecting leaks in the cooling tubes in this condenser, which arrangement is designed in accordance with the present invention.

FIG. 2 is a perspective view of part of a plenum assembly comprising part of the overall leak detecting arrangement illustrated in FIG. 1.

Turning now to the drawing, a steam condenser is illustrated in FIG. 1 and generally designated by the reference numeral 10. This condenser is of a conventional type comprising part of the previously described process loop for driving a steam turbine. As seen in FIG. 1 this condenser includes an overall housing 12 defining an inner condensation chamber 14. A plurality of cooling tubes 16 are located within this chamber and are supported therein by a front tube sheet or sheets 18 and a back tube sheet or sheets 20. Note that the front ends of the tubes are at most flush with and in any event do not project beyond the front face of their supporting sheet 18. While not shown, this is also true of the back ends of the tubes relative to their supporting sheet 20.

As illustrated in FIG. 1, the front tube support sheet or sheets 18 are located within an opening 22 in the front side of housing 12 and, while not shown, there is a similar opening provided across the backside for exposing the back sheet or sheets 20. An inlet water box 24 is disengageably mounted across opening 22 and defines an inner water receiving compartment 25 in fluid communication with the supported front ends of tubes 16. A similar outlet water box 26 is disengageably mounted across the opening of the backside of housing 12 for defining its own inner compartment in fluid communication with the adjacent backends of the tubes.

During normal operation of the condenser 10, water or other suitable coolant is continuously circulated through tubes 16 from their front ends to their back ends by first passing this water into inner compartment 25 of inlet water box 24 through one or more suitable openings (not shown). The water thereafter passes through the tubes and into the compartment of the outlet water box and thereafter out the latter through suitable opening (also not shown). The cooling water used is circulated by conventional pump means (not shown) and typically comes from a nearby lake, stream, or the like as stated previously. As this cooling water is circulated through tubes 16, the combination steam and water which results from operating the turbine engine previously discussed is directed into condensation chamber 14 through an appropriate inlet or inlets (not shown) in the top side of the housing, as indicated by arrow 28. This combination of steam and water passes across the cooling tubes causing the steam to condense and to collect in the form of water along with the other water at the bottom of the chamber. All of this water is directed out of the housing through an appropriate outlet or outlets (not shown) as indicated by the outlet arrow 30 and eventually directed to the previously discussed steam generator.

During the condensation process just described, a vacuum is typically produced within the condensation chamber. In this regard, a conventional air ejector assembly 32 is provided for passing air from the chamber during creation of this vacuum. This assembly uses conventional means such as a pumper jet air ejector (not shown) and conventional conduit or manifold means for drawing air from the condensation chamber and directing it to a remote location. As will be seen hereinafter, the preferred leak detecting technique disclosed herein uses this vacuum and the ejector assembly to its advantage when a plurality of condensers are interconnected such that a vacuum in one operating condenser results in a vacuum in the chambers of all interconnected condensers. This is typically the case in relatively large steam generating facilities.

Having described condenser 10 and its method of operation, attention is now directed to an overall arrangement generally indicated at 34 for detecting leaks in the cooling tubes 16. This arrangement includes a plenum assembly 36 for directing a discrete amount of tracer gas, for example helium, into a group of the cooling tubes at their front ends. As will be seen hereinafter, this is accomplished in a way which prevents the tracer gas from escaping into ambient surroundings as it is directed into the tubes. Arrangement 34 also includes an assembly 38 connected with the tubes receiving tracer gas for forcing the tracer gas therethrough from their front ends to their back ends. In this way, if any of the tubes have leaks, a portion of the gas will be drawn out into chamber 14 through the leaks by the vacuum in the chamber and eventually out through air ejector assembly 32. A conventional tracer gas detector 40, for example, a conventional helium detector when helium is used as the tracer gas, is provided as part of overall arrangement 34. This detector may be interconnected directly into the stream of air drawn by air ejector assembly 32 as described previously but is preferably interconnected with assembly 32 through a conventional bypass arrangement for receiving a continuous sample of the drawn out air. In either case, the detector is provided for detecting any of the escaping tracer gas as the latter is drawn out with the air from the condensation chamber. At the same time, arrangement 34 provides means 42 for preventing the nonescaping tracer gas reaching the back ends of the tubes from reaching detector 40, for example through leaks in the back support plate 20 or housing 12, and thereby adversely affecting its accuracy in detecting the tracer gas actually escaping from the leaks. In a preferred embodiment, assembly 38 includes an exhaust air pump 43 connected into the inner compartment of waterbox 26 by conduit 45. In this embodiment, means 42 is a conduit connected to the output of the exhaust pump for directing the exhausted output (including the non-escaping tracer gas) to a remote location away from the detector 40.

Turning to FIG. 2 in conjunction with FIG. 1, attention is specifically directed to Plenum assembly 36. As seen in these figures, this assembly includes a plenum housing 44 defining a chamber 46 opened to the ambient surroundings at the front face 48 of the housing. A circumferential seal 50 of rubber or other such suitable material is fixedly mounted to front face 48 around chamber 46 as seen in FIG. 2. In this way, when the plenum housing is placed against a section of tube sheet 18 including the front ends of certain tubes 16 in the manner shown in FIG. 1, chamber 46 is maintained in sealed communication with the front ends of these tubes.

Plenum housing 44 also includes a distribution baffle 52 having spaced apertures 54 therethrough. This baffle is located within and extends across chamber 46 rearwardly of front face 48 and seal 50 and directly in front of an inlet 56 adapted to pass tracer gas into the plenum chamber from a supply to be described below. The distribution baffle is provided for more uniformly distributing the tracer gas across the plenum chamber after the tracer gas first enters the chamber through inlet 56. In this way, the tracer gas is more uniformly directed into the various tubes within the confines of the seal 50 when plenum housing 44 is placed against tube sheet 18.

Plenum assembly 36 also includes a supply of tracer gas 58, helium in a preferred embodiment as stated above, and means for selectively connecting this supply to chamber 46. This latter means include a suitable conduit 60, preferably a flexible tubing constructed of rubber or similar material, which is readily disengageably connected to housing 44 for communication with inlet 56 by suitable means such as the extension 57 in FIG. 2. This selective means also includes a conventional three way valve 62, operable between three positions, as indicated in FIG. 2. In one position, valve 62 is opened to supply 58 and chamber 46 for passing tracer gas from the supply into chamber 46. With the valve in this position, it is closed to the ambient surroundings through the stem 64 or other suitable opening means not illustrated in FIG. 2. However, with the valve in its second position, the passage through stem 64 is opened while the valve is maintained closed to tracer gas supply 58. Finally, the valve is entirely closed in its third position so that neither tracer gas from supply 58 nor air from the ambient surroundings can enter the valve.

Having described the leak detecting arrangement 34 structurally, attention is now directed to the way in which it is utilized for detecting leaks in the cooling tubes of the steam condenser which is interconnected with other condensers such that the aforedescribed vacuum results in all the condensation chambers of the interconnected condensers if any of the condensers are operating. In order to check for tube leaks in one of these condensers, for example, the previously described condenser 10, it is disconnected from the previously described process loop but is allowed to remain interconnected to the other condensers so that a vacuum is nevertheless maintained. At the same time, condensation chamber 14 is allowed to drain and the cooling tubes 16 are disconnected from their source of coolant. In this regard the water box 24 is removed to expose front tube sheet 18 while the inner compartment of water box 26 is coupled to exhaust fan 43 by means of conduit 45.

The leak detecting technique is thereafter carried out by first selecting a particular group of adjacent tubes 16. The particular tubes selected will depend upon the size and shape of the front opening in plenum housing 44. In this regard, overall plenum assembly 36 preferably includes a number of housings 44 and associated components as described with respect to FIG. 2. These housings and associated components are identical to one another except for the size of its chamber 46 and its front opening. Initially, the largest of these housings is interconnected with conduit 60 and is placed firmly against the front face of tube sheet 18 around the front ends of an appropriately sized group of tubes as illustrated in FIG. 1. The previously described seal 50 around the front face 48 of housing 44 seals the front ends of these selected tubes from the ambient surroundings. During this procedure, the valve 62 is maintained in either its second interconnecting position or its third entirely closed position (as described previously) and in any event is maintained closed to the supply 58 of tracer gas. However, once the plenum housing 44 is maintained in the described position, valve 62 is moved to its first position for a discreet period of time, thereby allowing a discreet amount of tracer gas to pass into chamber 46. Thereafter, exhaust from pump 43 is turned on while valve 62 is moved to its second ambient air connecting position. In this way, the tracer gas within chamber 46 is drawn through the selected tubes along with the flow of air fron the front ends of the tubes to the back ends thereof and into chamber 46 where it is eventually exhausted through conduits 45 and 42 to a remote location.

As the combination of air and tracer gas is drawn through the selected tubes, some of the tracer gas will find its way through leaks in the latter, if any exist, and escape into chamber 14. In actual practice, the escaping gas is drawn into the chamber by the vacuum therein and ultimately to detector 40 by means of air ejector assembly 32, where it is detected to indicate the presence of a leak. Obviously, if no leaks exist in the selected tubes, all of the tracer gas will pass through the tubes and eventually to the remote location and hence will not be detected. However, if there is an indication of a leak, this procedure is repeated for successively smaller plenum housings 44 until the leak or leaks are isolated. In this regard, it may be necessary to apply a discrete amount of tracer gas to each tube within a selected group, and, in this regard, the plenum housing 44 can be replaced with a single injection tube for insertion within the individual cooling tubes. This injection tube might be the free end of conduit 60 if it is of the proper size.

In normal practice, when a particular cooling tube is found to leak in a condenser of the type described, that tube is generally plugged rather than being fixed or replaced. However, if for some reason it is desirable to determine the location of the leak, that is, whether it is closer to the front tube sheet or the back tube sheet or centrally located between the two, this can be accomplished by the present technique. More specifically, by carefully noting the time at which the tracer gas is injected into the chamber of housing 44, and by timing how long it takes to actually detect the leak, its general location along the length of the leaking tube can be determined. Obviously, the longer it takes to detect the tracer gas, the further from plate 18 the leak is, that is assuming that there is only one leak or that all of the leaks in the group of tubes under test are located at approximately the same points along their length.

While overall leak detecting arrangement 34 is especially suitable for detecting leaks in the cooling tubes of a condenser as described, it is to be understood that this arrangement may also be used for detecting leaks in one or more tubes generally. This is equally true whether or not the vacuum exists around the tubes being evaluated, although it should be quite apparent that the accuracy will be enhanced in those situations where a vacuum does exist. In addition, while arrangement 34 has been described as using helium as its tracer gas and preferred embodiment, other tracer gases such as sulfur hexafluoride could be utilized. Sulfur hexafluoride would permit smaller leaks to be detected as compared to helium. Moreover, rather than exhausting air from the entire outlet water box, air and the tracer gas could be exhausted from the individual tubes, although this would most likely require an additional individual and hence be less economical. Also, while it is preferred to draw the tracer gas through the tubes by exhaust means, the tracer gas can be pushed through by an air supply at the front end of the tubes, for example through stem 64 of valve 62. In addition, while air is the preferred means of carrying the tracer gas through the tubes, the present invention is not limited to air.

What is claimed is:

1. An arrangement for detecting leaks in a plurality of discrete tubes which have opposite adjacent open ends and which form part of a given apparatus also having an inner chamber surrounding said tubes such that the open ends of the latter are accessible from outside said chamber, said arrangement comprising:
   (a) means located outside said inner chamber and cooperating with the adjacent open ends of selected ones of said tubes for directing tracer gas into said selected tubes at the cooperating adjacent ends of the latter while, at the same time, isolating said adjacent open ends from the ambient surroundings so as to prevent any tracer gas from escaping into the ambient surroundings including said inner chamber as the tracer gas is directed into said tubes;
   (b) means for drawing said tracer gas through said selected tubes from said cooperating adjacent ends to opposite adjacent ends thereof such that, if any of said selected tubes have leaks, a portion of said gas will escape into said chamber through said leaks before reaching said opposite ends;
   (c) means cooperating with said opposite adjacent ends of said selected tubes for capturing all of the tracer gas reaching said opposite ends and directing the captured tracer gas to a remote location; and
   (d) means for drawing said escaping gas, if any, to a predetermined detection point and detecting the gas at said point, whereby to indicate the presence of a leak.

2. An arrangement according to claim 1 wherein said first mentioned drawing means includes an exhaust pump cooperating with said capturing means for drawing said tracer gas through said selected tubes from said cooperating adjacent ends to said opposite adjacent end and for directing said captured gas to said remote location.

3. An arrangement according to claim 1 wherein said tracer gas directing means includes a plenum assembly outside said inner chamber and having a plenum housing adapted to engage over the cooperating adjacent ends of said selected tubes so as to prevent any tracer gas from escaping into the ambient surroundings as it is directed into said tube.

4. An arrangement according to claim 3 wherein said plenum housing includes a front face and defines a housing chamber opened to the ambient surroundings at said front face and wherein said plenum assembly also includes seal means on the front face of said housing and extending around said chamber for sealing said chamber in communication with the cooperating adjacent ends of said selected tubes, a supply of said tracer gas and means for selectively connecting said supply with said chamber whereby to cause tracer gas to pass into said housing chamber and thereafter be drawn through said selected tubes by said first mentioned drawing means.

5. An arrangement according to claim 4 wherein said plenum housing is disengageably connected with said connecting means and wherein said plenum assembly includes at least one other housing disengageably connectable with said connecting means and defining a smaller housing chamber opened to the ambient surroundings at its front face and seal means on said second housing extending around said second chamber for sealing the latter in communication with the front ends of a lesser number of said tubes.

6. An arrangement according to claim 4 wherein said connecting means includes switch means movable between a plurality of positions including a first position for connecting said supply of tracer gas with said chamber and a second position for connecting the ambient air with said chamber whereby to cause air to pass into said housing chamber and thereafter be drawn through said selected tubes.

7. An arrangement according to claim 6 wherein said plenum housing includes a distribution baffle having spaced apertures therethrough, said baffle being located within and extending across said housing chamber for uniformly distributing the tracer gas entering the housing chamber from said supply as said gas passes out the opened front face of said housing.

8. An arrangement according to claim 6 wherein said plurality of positions includes a third position for closing both said gas supply and air connections.

9. An arrangement according to claim 1 wherein said apparatus is a steam condenser and said inner chamber surrounding said tubes serves to pass steam to be condensed across the latter whereby any of said gas escaping from said tubes through said leaks enters said condenser chamber, said condenser including means for connecting said tubes in fluid communication with a supply of coolant, said tubes being disconnected from said supply during detection of said leaks, and wherein said point of detection is one outside said condenser chamber.

10. An arrangement according to claim 9 wherein said condenser is interconnected with other operating condensers such that a vacuum developes in said inner chamber, said other condensers forming part of said drawing and detecting means for drawing said escaping gas to said detection point by means of said vacuum.

11. A method of detecting leaks in a plurality of discrete tubes which have opposite adjacent ends and which form part of a given apparatus also having an inner chamber surrounding said tubes such that the open ends of the latter are accessible from outside said chamber, said method comprising:

(a) selecting a particular group of said tubes and from outside said inner chamber directing tracer gas into adjacent open ends of the selected tubes while, at the same time, isolating the adjacent open ends from the ambient surroundings for preventing the tracer gas from escaping into the ambient surroundings including the inner chamber of said apparatus as the tracer gas is directed into the selected tubes;

(b) drawing said tracer gas through said selected tubes from said adjacent ends to opposite adjacent ends thereof so that, if any of said selected tubes have leaks, a portion of said gas will escape into said inner chamber through said leaks before reaching said opposite ends;

(c) capturing all of the tracer gas reaching said opposite adjacent ends and directing the captured tracer gas to a remote location; and (d) drawing said escaping gas, if any, to a predetermined detection point and detecting the gas at said point whereby to indicate the presence of a leak.

12. A method according to claim 11 wherein said tracer gas is directed into said selected tubes through a chamber in a plenum assembly which assembly, at the same time, isolates the first mentioned adjacent ends of said selected tubes from the ambient surroundings, said step of directing said tracer gas into said tubes while at the same time isolating said adjacent ends from the ambient surroundings including the steps of placing said chamber in sealed communication with the first mentioned adjacent ends of said tubes, thereafter introducing said tracer gas into said plenum chamber and, after said gas has been introduced into said chamber, providing said first mentioned drawing step whereby to draw the tracer gas through said tubes from said plenum chamber.

13. A method according to claim 11 wherein said apparatus is a condenser and said inner chamber surrounding said tubes serves to pass steam to be condensed across the tubes, whereby any of said gas escaping from said tubes through said leaks enters the condenser chamber, said step of drawing escaping gas, if any, to a predetermined detection point including the step of connecting said condenser chamber to other operating condensers which develop a vacuum in said condenser chamber.

* * * * *